(No Model.)
S. B. FERGUSON.
CHEESE VAT.
No. 285,803. Patented Oct. 2, 1883.
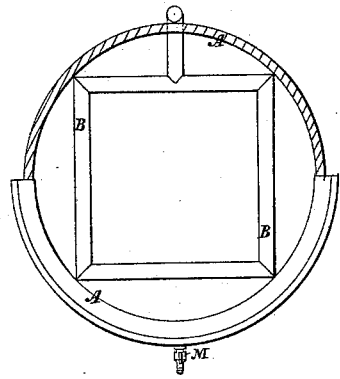
Fig. 1,
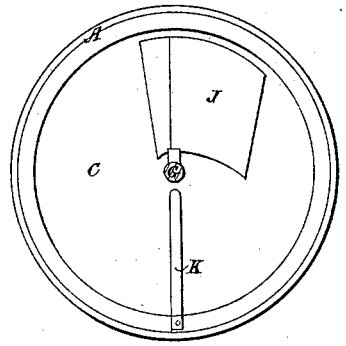
Fig. 2,
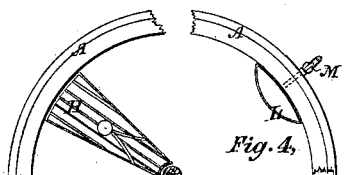
Fig. 5, Fig. 4,
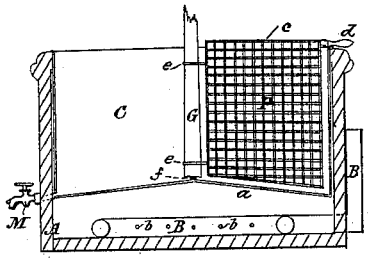
Fig. 6,
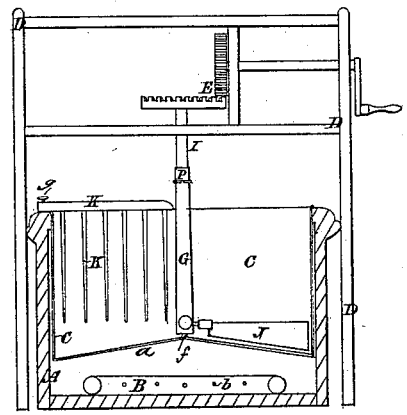
Fig. 3,
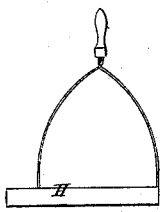
Fig. 7,
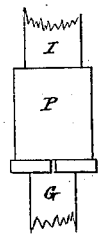
Fig. 9. Fig. 10,
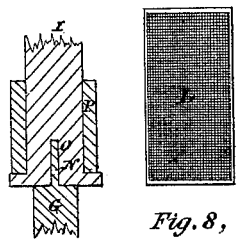
Fig. 8,
WITNESSES
John Richards
J. B. Wright
INVENTOR
Stephen B Ferguson

UNITED STATES PATENT OFFICE.

STEPHEN B. FERGUSON, OF HALLOWELL TOWNSHIP, ONTARIO, CANADA.

CHEESE-VAT.

SPECIFICATION forming part of Letters Patent No. 285,803, dated October 2, 1883.

Application filed September 1, 1881. (No model.) Patented in Canada September 17, 1881, No. 13,413.

*To all whom it may concern:*

Be it known that I, STEPHEN B. FERGUSON, a subject of Great Britain, residing at Hallowell township, county of Prince Edward, and Province of Ontario, Canada, have invented certain new and useful Improvements in Cheese-Vats; and I do hereby declare that the following is a full, clear, and exact description of the same, reference being had to the accompanying drawings, in which—

Figure 1 is a top plan view of the vat partly in section and showing the steam-pipes; Fig. 2, a top plan view of the vat with the floater and comb connected thereto; Fig. 3, an elevation of the complete machine with the vat in section; Fig. 4, a detail view, showing a portion of the vat and strainer connected thereto; and Fig. 5, a similar view of the vat, showing the curd-cutter in position with relation thereto; Fig. 6, a longitudinal vertical section of the vat, showing one of the forms of cutting-knives and steam-pipes located within the same. Fig. 7 is a detail view of the knife shown in Fig. 5; Fig. 8, a detail view of the strainer shown in Fig. 4; and Figs. 9 and 10, elevations and sections, respectively, of the shaft-coupling.

The present invention has relation to certain new and useful improvements in cheese-vats, and has for its object to provide a simple, practical, and effective device or machine for the manufacture of cheese, and in which the formation and manipulation of the curd is readily and easily accomplished, and cheese of a more superior quality than that usually placed upon the market produced. The above objects I attain by the construction substantially as shown in the drawings, and hereinafter described and claimed.

In the accompanying drawings, A represents the tub or vat, of circular form, on the bottom of which is located the rectangular steam-pipes B, provided with perforations $b$ for the escape of the steam in jets, so that it will be evenly distributed. These pipes are disposed between the bottom of the vat A and bottom of an interior vessel, C, said vessel being of somewhat less diameter than the vat, so that a space will be left between the sides and bottoms of the two vessels, around which the steam passes as it escapes from the perforations in the pipes. The vessel C is provided with an inclined or cone-shaped bottom, $a$, to give a greater area of heating-surface for the steam to impinge against; also, upon the interior of the vessel, to better conduct the whey to the faucet M, through which it is drawn off.

A frame, D, supports the running-gear E, which may be of the usual construction; but, if preferred, the gearing may be supported by a frame above and independent of the vat.

The milk is placed within the vessel C, and after it has undergone the usual heating and other processes the curds are cut in a horizontal direction by a knife, F. The knife F is constructed or consists of a number of wires, $c$, as shown in Fig. 6, said wires running horizontally and vertically, forming a frame which is inclined at its lower edge to conform to the inclination of the bottom of the vessel C. The knife is provided with a suitable handle, $d$, and collars $e$, said collars being slipped over the end of a central vertical shaft, G. The shaft G is slightly tapering, being largest in diameter at its lower end, so that the collars $e$ will tightly fit thereon, the shaft being supported upon a pivot, $f$, projecting from the bottom $a$ of the vessel C. The shaft, at its upper end, is connected with a shaft, I, by means of a tongue, N, on the end of the shaft G, entering a groove, O, in the lower end of the shaft I, and a coupling-sleeve, P, which holds the two shafts together. Any suitable means, however, may be employed for connecting the two shafts together, so long as it will admit of their being readily separated or detached when the shaft I and gearing are not required, as would be the case in operating the knife F, which cuts the curds in a horizontal direction as it revolves around the shaft, after which they are cut in a vertical direction by the employment of a knife, H. This knife is somewhat similar to the knife F, and, being taken in the hand by the operator, is worked regularly around the surface of the contents of the vat, by which means the curds are divided up into pieces of suitable dimensions. The knives being removed, the floater J is connected to the shaft by any suitable means, and the comb K placed in position and attached to the rim of the vat A by a suitable set-screw, $g$. The floater is now revolved by means of the gearing E, which causes the curds to rise from the bottom and become intermingled with the whey, while the comb K prevents the curds and whey whirling around with the floater. The strainer L is then placed in position over the opening to the faucet M, and when the faucet is opened the whey is drawn off and the curds drained, thereby avoiding the delay or inconvenience of ladling out the whey or removing it with a siphon.

Having now fully described my invention, what I claim as new, and desire to secure by Letters Patent, is—

A cheese-vat having an outer and inner vessel, the perforated steam-pipe B, for heating and cooking the curd, the frame D, gearing E, and shaft I, supporting the detachable shaft G, the lower end of which is pivoted in the cone-shaped bottom of the inner vessel jointly with the floater J, and knife F, capable of being attached to said shaft, and comb K, for cutting and floating the curds, substantially as described.

STEPHEN B. FERGUSON.

Witnesses:
JOHN RICHARDS,
J. B. WRIGHT.